US012676051B2

(12) United States Patent
Bergant et al.

(10) Patent No.: US 12,676,051 B2
(45) Date of Patent: Jul. 7, 2026

(54) LIVE ACTION CRAPS TABLE WITH OPTICAL HAND AND DICE TRACKING

(71) Applicant: Interblock d.o.o., Menges (SI)

(72) Inventors: Urban Bergant, Kamnik (SI); Andrej Tomeljak, Preserje pri Radomljah (SI); Andraž Balantič, Podgorje (SI); Martin Bergant, Podgorje (SI)

(73) Assignee: INTERBLOCK D.O.O., Menges (SI)

( * ) Notice: Subject to any disclaimer, the term of this patent is extended or adjusted under 35 U.S.C. 154(b) by 270 days.

(21) Appl. No.: 18/390,540

(22) Filed: Dec. 20, 2023

(65) Prior Publication Data

US 2024/0221462 A1 Jul. 4, 2024

Related U.S. Application Data

(60) Provisional application No. 63/477,793, filed on Dec. 29, 2022.

(51) Int. Cl.
*G07F 17/32* (2006.01)

(52) U.S. Cl.
CPC ...... *G07F 17/3241* (2013.01); *G07F 17/3211* (2013.01); *G07F 17/322* (2013.01); *G07F 17/3237* (2013.01); *G07F 17/3288* (2013.01)

(58) Field of Classification Search
None
See application file for complete search history.

(56) References Cited

U.S. PATENT DOCUMENTS 6,609,710 B1 8/2003 Order
6,676,517 B2 1/2004 Beavers
10,183,214 B2 1/2019 Katz
10,546,458 B1 * 1/2020 Fujita .................. G07F 17/3288
10,672,223 B2 6/2020 Bergant
11,195,370 B2 12/2021 Bergant
11,580,817 B2 * 2/2023 Fink .................... G07F 17/3288
12,080,121 B2 * 9/2024 Kelly ...................... G06T 17/00
2003/0232651 A1 12/2003 Huard et al.
(Continued)

FOREIGN PATENT DOCUMENTS

AU 2018337670 A1 4/2020
CN 109074703 A 12/2018
(Continued)

OTHER PUBLICATIONS

International Patent Application No. PCT/US2018/054744; Int'l Search Report and the Written Opinion; dated Dec. 27, 2018; 8 pages.
(Continued)

*Primary Examiner* — Ronald Laneau
(74) *Attorney, Agent, or Firm* — BakerHostetler

(57) ABSTRACT

A craps gaming system comprising a craps table having a layout and configured to enable a player to physically be the shooter of dice at the craps table. The system includes one or more ambient light cameras positioned to observe action above the layout and output optical data including the observed action and at least the layout on a display, and a computing device receiving and analyzing the optical data, determining a result of the dice, and generating an overlay for the display including computing device-generated images of the dice and the observed action.

20 Claims, 8 Drawing Sheets

(56) References Cited

U.S. PATENT DOCUMENTS

| | | | | |
|---|---|---|---|---|
| 2006/0287101 | A1 | 12/2006 | Crawford et al. | |
| 2008/0217851 | A1* | 9/2008 | Colton | A63F 3/00157 273/274 |
| 2008/0248864 | A1 | 10/2008 | Toyoda et al. | |
| 2009/0098932 | A1 | 4/2009 | Longway | |
| 2009/0118005 | A1 | 5/2009 | Kelly et al. | |
| 2009/0124348 | A1 | 5/2009 | Yoseloff et al. | |
| 2009/0131151 | A1 | 5/2009 | Harris et al. | |
| 2009/0143141 | A1 | 6/2009 | Wells et al. | |
| 2009/0325686 | A1 | 12/2009 | Davis et al. | |
| 2010/0093429 | A1 | 4/2010 | Mattice et al. | |
| 2010/0253782 | A1 | 10/2010 | Elazary | |
| 2011/0092266 | A1 | 4/2011 | Kitamura | |
| 2011/0111840 | A1 | 5/2011 | Gagner et al. | |
| 2016/0012671 | A1 | 1/2016 | Alsip | |
| 2017/0154489 | A1 | 6/2017 | Chun | |
| 2018/0189921 | A1 | 7/2018 | Feng et al. | |
| 2018/0315276 | A1 | 11/2018 | Persson et al. | |
| 2018/0357850 | A1 | 12/2018 | Moore et al. | |
| 2019/0108713 | A1* | 4/2019 | Fink | G07F 17/3288 |
| 2019/0108714 | A1 | 4/2019 | Bergant | |
| 2019/0164381 | A1 | 5/2019 | Feng et al. | |
| 2019/0188969 | A1* | 6/2019 | Nelson | G07F 17/3206 |
| 2020/0035067 | A1 | 1/2020 | Nelson et al. | |
| 2021/0110018 | A1 | 4/2021 | Rowe et al. | |
| 2021/0134108 | A1 | 5/2021 | Soukup et al. | |
| 2021/0304550 | A1 | 9/2021 | Kelly et al. | |
| 2024/0112535 | A1* | 4/2024 | Aikawa | G07F 17/3241 |
| 2024/0216786 | A1* | 7/2024 | Bergant | G07F 17/3288 |

FOREIGN PATENT DOCUMENTS

| | | | |
|---|---|---|---|
| CN | 110021123 | A | 7/2019 |
| CN | 110662585 | A | 1/2020 |
| CN | 111867689 | A | 10/2020 |
| CN | 113870493 | A | 12/2021 |
| CN | 115413354 | A | 11/2022 |
| TW | 201642219 | A | 12/2016 |
| WO | WO 2008/055286 | A1 | 5/2008 |
| WO | WO 2022/006674 | A1 | 1/2022 |

OTHER PUBLICATIONS

International Patent Application No. PCT/US2018/054744; Int'l Preliminary Report on Patentability; dated Nov. 25, 2019; 18 pages.

International Patent Application No. PCT/US2023/085864; Int'l Preliminary Report on Patentability; dated Feb. 18, 2025; 21 pages.

International Patent Application No. PCT/US2023/085864; Int'l Search Report and the Written Opinion; dated Apr. 23, 2024; 15 pages.

* cited by examiner

LIVE ACTION CRAPS TABLE WITH OPTICAL HAND AND DICE TRACKING

CROSS REFERENCE TO RELATED APPLICATIONS

This application claims benefit under 35 U.S.C. § 119(e) of Provisional U.S. Patent Application No. 63/477,793, filed Dec. 29, 2022, the contents of which is incorporated herein by reference in its entirety.

TECHNICAL FIELD

This disclosure relates generally to gaming systems, and more specifically to live craps table gaming.

BACKGROUND INFORMATION

Craps is a popular wagering game played in casinos and other gaming establishments. In physical versions of the game, players gather around a table about 13 feet long and 5 feet wide with a felt surface and walls about 1 foot high with a padded or rubber surface. The felt surface includes a layout that displays various betting possibilities. Players bet on various betting options by placing chips directly on marked sections of the layout or the players ask one of the dealers to place the bet on the layout for them. The typical bets and outcomes from craps betting are well known.

Once all bets have been placed, one player (called the "shooter") is selected to throw a pair of dice. Five dice will typically be offered to the shooter from which the shooter selects two dice to roll, with the remainder not being used. Once the dice have been selected by the shooter, typically no more bets can be placed. For the roll by the shooter to be valid, both dice must typically hit the farthest wall opposite the shooter and remain on the table. A typical craps table requires space for the bank, thousands of chips belonging to the casino and used to pay winning bets and to store losing bets and bank chips, and typically requires four dealers to manage the bank, place, pay out and collect bets and manage the dice. As a result of the room required for the bank and the dealers, there is a limited amount of room left for players, which limits the revenue that one craps table can generate.

A stadium craps setting includes a similar table, but requires a single dealer and the shooter. Instead of crowding around the table, the remaining players sit at individual computerized consoles arranged in a stadium configuration around one or both sides of the table. This configuration enables more players to be able to play at each table. Each player can place their bets on a display screen of their console using one or more user interfaces. Bets are placed using credits instead of physical chips and each player can easily place their bets anywhere on the layout through a graphical user interface without requiring assistance from a dealer. The shooter is chosen from among the players, which causes them to leave their console and come down to the table where the dice can be thrown.

At a crowded craps table, and even a stadium craps setting, security remains an issue because many different attempts are made to cheat in some way. Making the game as secure as possible is always a challenge. One way in which cheating can occur involves the dice and how the dice are read. Each casino uses its own dice that are marked in particular ways, carefully weighed and measured, formed of transparent materials so they can be inspected for foreign objects, and carefully guarded when not in use. As a result, casinos are not interested in using dice that include radio-frequency identification devices inside to help read the dice as they can affect the security of the dice. Using optical systems to read the dice, instead of just relying on a human dealer that could make a mistake or be cheating along with a player is an option, but optical systems are challenged by the amount and type of other light that is used in casino environments. In addition, in gaming systems that require the dealer to enter the result, there have been incidents where dealers were distracted and unauthorized persons were able to access the dealer's console and enter incorrect results.

SUMMARY

An embodiment is directed to a craps gaming system comprising a craps table having a layout and configured to enable a player to physically be the shooter of dice at the craps table; one or more ambient light cameras positioned to observe action above the layout and output optical data including the observed action and at least the layout on a display; and a computing device receiving and analyzing the optical data, determining a result of the dice, and generating an overlay for the display including computing device-generated images of the dice and the observed action.

These and other features will be more clearly understood from the following detailed description taken in conjunction with the accompanying drawings and claims. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EMBODIMENTS

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Disclosed herein are methods, systems, and computer readable storage media that provide for increased guest satisfaction and game revenue generation. Some embodiments of the present invention are described herein in terms of a craps table wagering system for illustrative purposes. However, embodiments of the present invention are not limited to a craps table wagering system, but rather may be implemented in various wagering systems—both automated and manual—that provide similar functionalities as a craps table wagering system.

Figure 1:
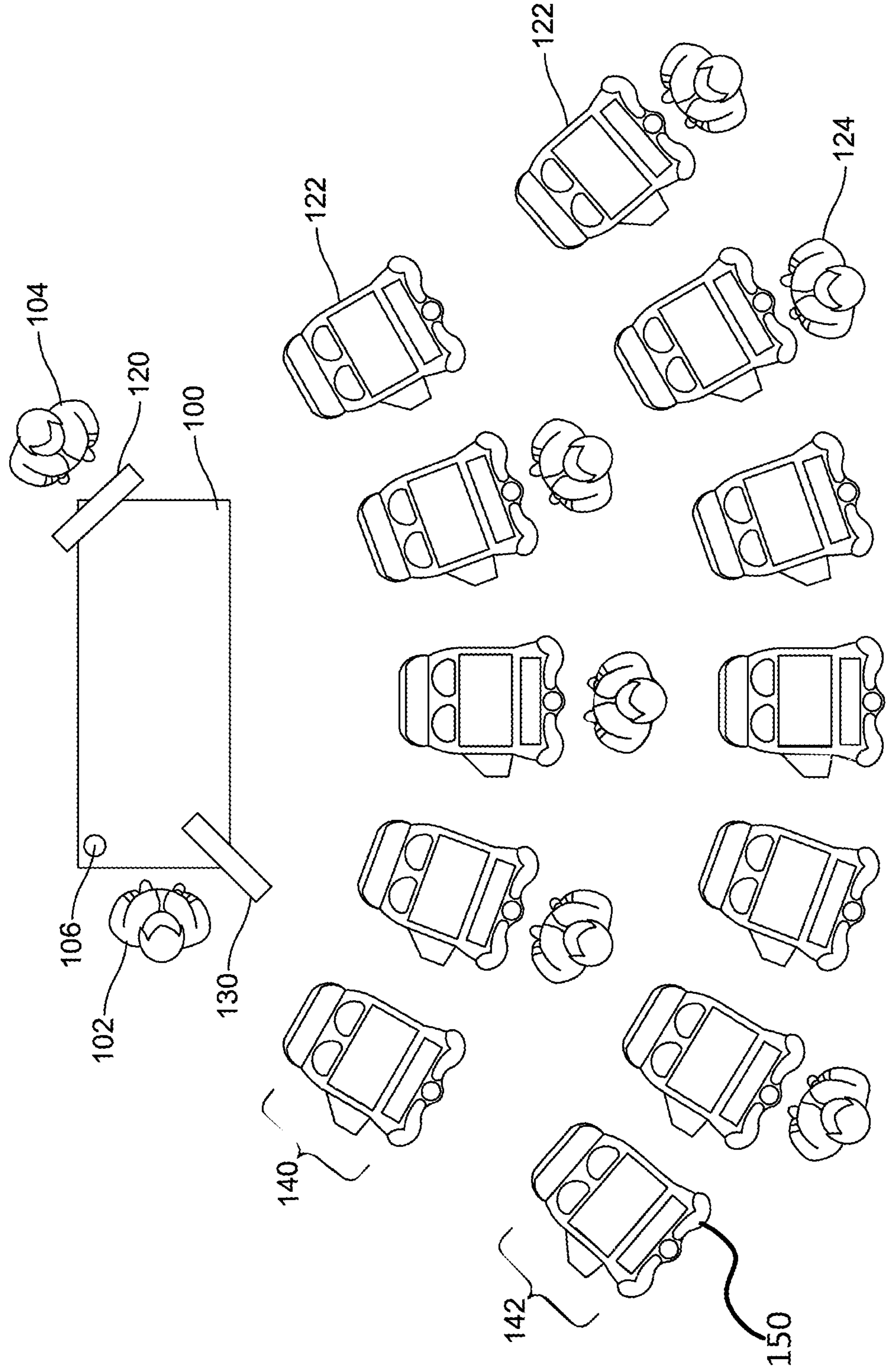
FIG. 1 is a diagrammatic, top view of a craps table in a stadium configuration, in accordance with an embodiment.

FIG. 1 illustrates a craps table set up in a stadium configuration. At the craps table 100 is a typical craps table on which a layout is displayed on which dice can be rolled by a shooter 102. A single dealer 104, called a "croupier," may be positioned to access a dealer's console 120. Although shown in FIG. 1 at a corner end of the table opposite the shooter, the dealer would normally be positioned in the middle of the table facing the other players so that the croupier may manipulated the dice with a stick and present the dice to the shooter. The orientation of the dealer console 120 would also be toward the croupier positioned in the middle of the table instead of toward the end or corner as shown.

Figure 2:
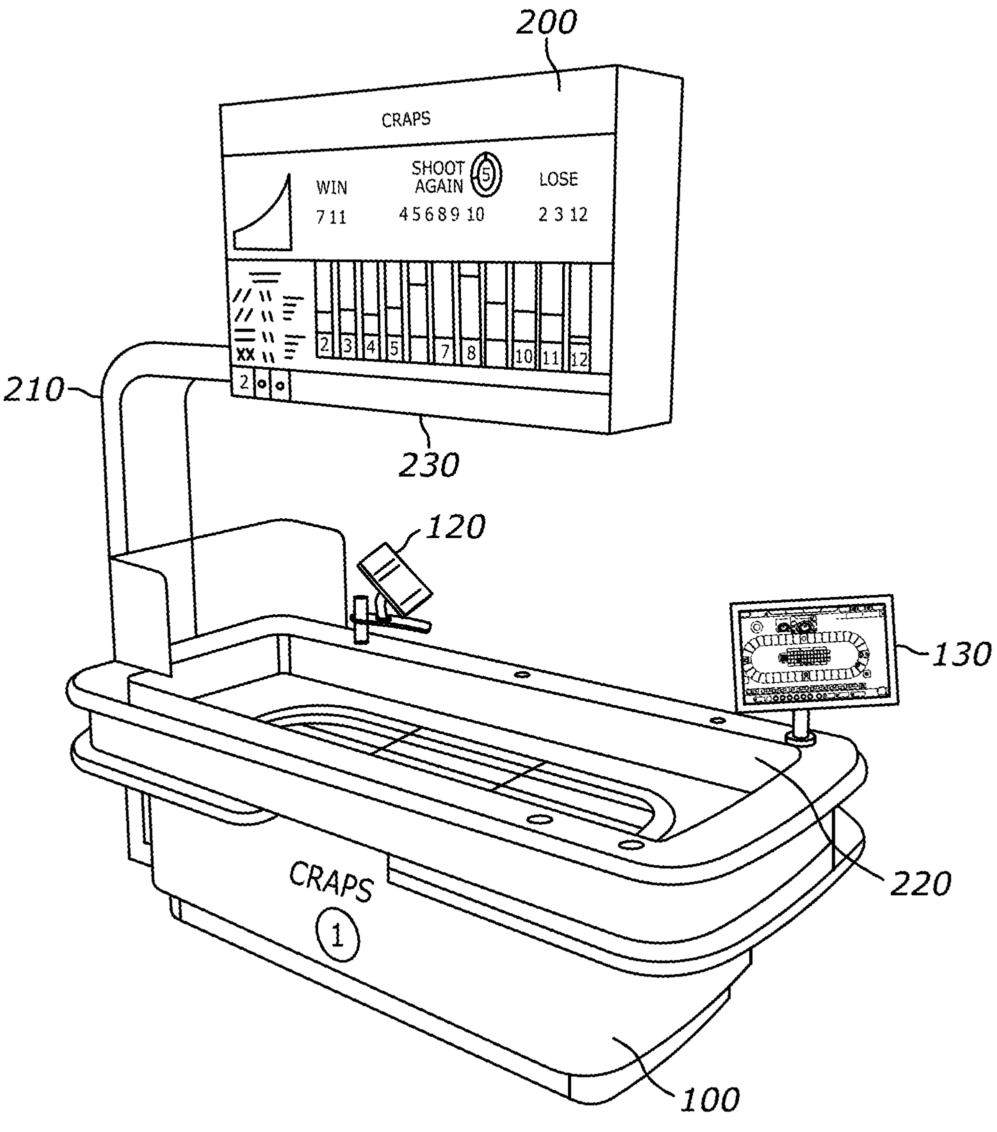
FIG. 2 is a prospective view of a craps table including a dealer station, a shooter station and an overhead display system.

FIG. 2 provides a correct positioning of the croupier, in the center of the table, with the dealer console 120 oriented toward the croupier's middle position, and the shooters console at one end. A protective clear glass or acrylic screen may be placed at the end of the table near the dealer to prevent dice from being thrown out of the table and to prevent someone from reaching around to access the dealer console 120. The croupier may call a player to step up to the table 100 and roll the dice. Once a player steps up to the table 100 to become the shooter, the croupier may remove five dice from a dice boat on the table and walk over and place the five dice in a dice area 106 on the table near the shooter 102. Alternatively, the croupier may act as a stickman to control the dice. For example, the croupier may use a long stick to push five dice into the dice area 106 or otherwise in front of the shooter. Once the shooter 102 has selected two dice among the five to shoot, the remaining three dice are removed.

In an embodiment, the player stations 122 are attached to the craps table 100, or closely surround the craps table, such that player's stand or sit at player stations and the craps table during play. The one unoccupied player station represents where the shooter would be located when not the shooter. If a different player was selected to the shooter, then a different player station would be unoccupied while that player was the shooter.

As further discussed herein, the dice area 106 may be monitored by optical sensors and cameras mounted at different locations and angles around the craps table 100. Regardless of the type of sensors used, once the shooter 102 picks up the dice, the sensors and cameras would monitor the shooter's hand and arm and the dice and at some point signal the dealer's console 120 and the consoles 122 of the other players 124 to disable any further bets from being placed. The point at which betting is stopped may be (1) when the shooter's hand is detected reaching for the dice, or (2) when the dice are removed from dice area 106, or (3) when the dice are detected flying over the dice area 106 or other parts of the table 100 after the dice are thrown.

In an embodiment, the shooter 102 also has a console 130 at the craps table 100 so the shooter can also place bets when operating as the shooter. In order for the shooter to have access to their credits and any other preferences they have made on their player console 122, it is necessary to mirror the shooter's player console 150 among the other player consoles 122 to the shooter console 130.

In an embodiment, the croupier selects a player to become the shooter. This is done by viewing the dealer console 120 to see which shooters qualify to become a shooter. In traditional craps this requires a player to have a bet on the Pass line or the Don't Pass line and the same requirement can now be implemented as the shooter can place bets as well. Hence, the dealer may first look for any player that has already placed a bet on the Pass line or Don't Pass line and then invite one of those players to be the shooter by selecting that player's console 122 from a list of consoles or stations listed on the dealer's console 120. Once a player 124 has been selected to be the shooter, a popup message will be displayed on the player's console 122 inviting the player to be the shooter. Not all players want to be the shooter, so the popup message gives the player the option of accepting or declining the invitation.

If the invitation is declined, the croupier may invite the next qualified player. As in traditional craps, where the invitation to be shooter is passed clockwise around the craps table, in the stadium setup, the invitation is also likewise passed clockwise down a row of players. If there are multiple rows of players, the invite may start on a first inside row 140 and then move to the outside row 142, before starting over again on inside row 140. If the invitation is accepted, such as by the player at shooter's player console 150, the graphical user interface and display for the shooter's player console 150 will be transferred to the shooter console 130, essentially mirroring console 150 to shooter console 130, so the exact same content displayed on the shooter's player console 150 is displayed on shooter console 130. A variety of techniques for mirroring the graphical user interface and display from one monitor to another monitor on the same network are known in the art. During the time the shooter's player console 150 is mirrored, shooter's player console 150 is disabled. Once the shooter returns to shooter's player console 150, the mirroring is terminated and shooter's player console 150 is enabled for use as a regular player's console 122.

When a shooter 102 is at the craps table 100, the shooter 102 is permitted to make additional bets on the shooter console 130. As the shooter console 130 is just a mirror of the graphical user interface and display, the shooter 102 cannot add additional funds as the shooter console may not be a fully functional player console with the ability to receive money. If the shooter 102 needs to add money, the shooter will need to return to the player console 150, which the croupier 102 can facilitate through the dealer console 120 by enabling the player console 150. Once the shooter 102 is ready and the game cycle is started, the shooter will pick two dice from the dice area 106 and throw them down the length of the table to the end where the croupier is located. As noted above, at some point prior to or during a dice roll, further betting at the player consoles 122 and the shooter console 130 will be stopped.

As with traditional craps, both dice should hit the wall at the opposite end, although some flexibility may be permitted if at least one dice does so. Once the result of the throw is observed by the sensors and/or cameras and the croupier 104 and a result has been reported to the croupier by the computing device analyzing the optical output of the sensors/cameras, the croupier may either confirm the result of the throw, such as by merely hitting a confirm button of some type on the dealer console 120, or if no confirmation is required, the croupier may be given a short period of time to observe the result and determine whether there has been a malfunction, i.e., a wrong detection, in which case the croupier may be able to cancel the result. In either case, once the result has been confirmed or not canceled within the applicable period, the game will be resolved and each player station 122 and the shooter station 130 will automatically be paid winning bets and/or or have lost bets collected, which then terminates the game cycle. In case the dealer does not confirm the result or cancels the result detected by the system, supervisor intervention may then be needed. The supervisor intervention may also be needed if the system fails to read the result. Only a supervisor may manually enter/change the result and confirm it as a valid one. In such a case, the result would not be entered as a number 2 through 12 but rather by entering 1-6 separately for each dice.

The first roll by the shooter 102 is called the come-out roll. If the shooter 102 rolls a 2, 3 or 12, this is called "craps" or "crapping out." If the come-out roll is craps, anyone betting the Pass line loses and anyone betting the Don't Pass line wins if the roll is 2 or 3 and ties or pushes if the roll is 12. The shooter 102 may keep rolling after crapping out. A come-out roll of 7 or 11 is called a "natural;" the Pass line wins and the Don't Pass line loses. The other possible numbers are the point numbers: 4, 5, 6, 8, 9, and 10. If the shooter rolls one of these numbers on the come-out roll, this establishes the "point." To "pass" or "win," the point number must be rolled again before a 7. If the shooter rolls any 7 before repeating the point number (a "seven-out"), the Pass line loses, the Don't Pass line wins, and the invitation to be the shooter is passed to the next eligible player. Once the shooter 102 has rolled a seven-out, the game cycle will be completed (i.e., bets payed and collected), mirroring to the shooter console 130 will be terminated the player console 150 will be enabled. Once a new shooter has accepted the invitation to be shooter, the process is repeated.

As illustrated in FIG. 2, the craps table 100 may include a display 200 positioned over the craps table. The display 200 may be part of the craps table and connected to the craps table by a stand or arm 210, or the display may be mounted within the ceiling above the craps table 100 or positioned in a stand-alone arrangement next to the craps table 100. In an embodiment, one or more sensor and cameras 230 may be positioned within the bottom of the display 200 to fully image the craps table 100. In an embodiment, the one or more sensors and cameras 230 may be positioned within the interior wall 220 of the craps table 100 or mounted within am arm separate from any display, in the event there is not display, or elsewhere that will permit the cameras to fully image the craps table 100.

Within a casino, there are many light sources at different frequencies, some steady and many flashing, that can interfere with optical systems used to track and recognize dice and other objects on or around craps table. In order to eliminate most interference, the one or more cameras 230 may operate in the near ultraviolet (UV) light spectrum so as to reduce interference from other lights. This may be achieved by using a monochromatic camera with a 405 nm wavelength (near-UV) filter mounted on the lens of the cameras or directly in front of the cameras. The filter may block the majority of ambient light (i.e., >99.8%). The exception being light in the approximately 390-425 nm wavelength, which is not emitted by most light sources, particularly those inside casinos. Light at this wavelength is also safe to the eyes of most humans as the lens to the human eye blocks most radiation in the 300-400 nm wavelength range.

Figure 8:
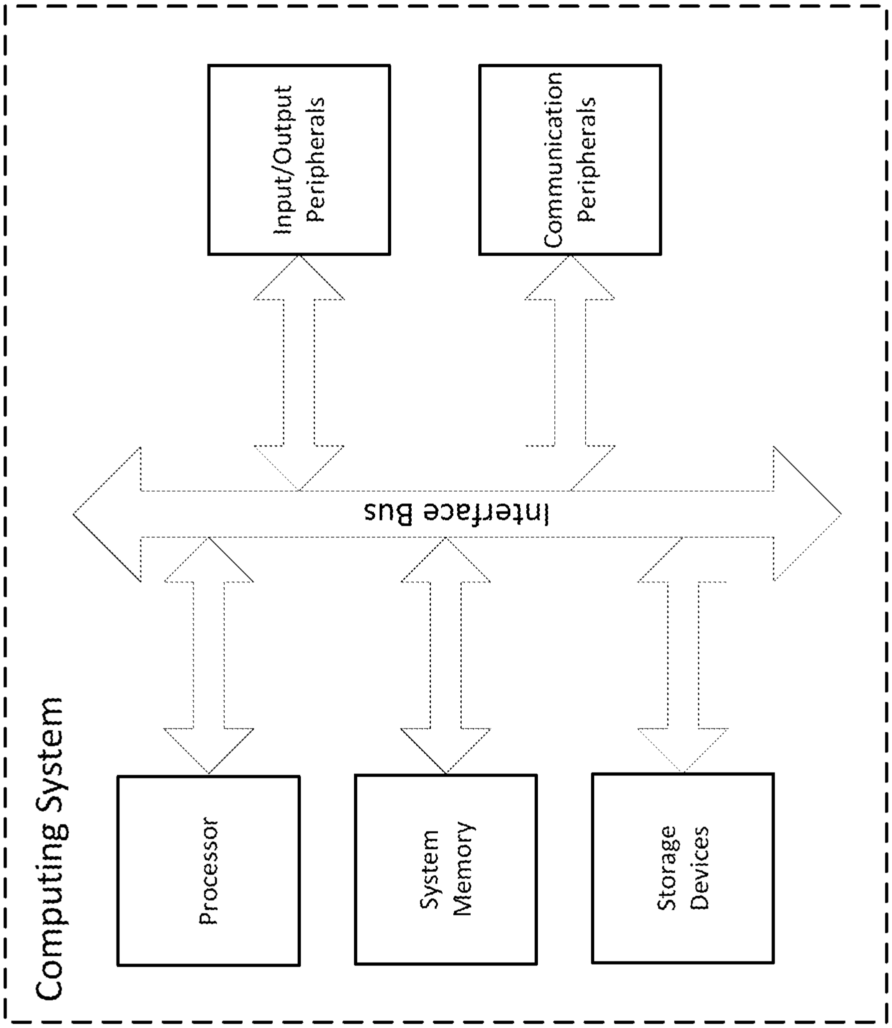
FIG. 8 is an illustration of an exemplary block diagram representing a general purpose computer system in which aspects of the methods and systems disclosed herein or portions thereof may be incorporated.

To make use of the near-UV cameras, once the dice have been rolled and the dice result is ready, the table may be very briefly flashed with 405 nm light emitting diode (LED) light that can be detected by the near-UV cameras. To make sure that the near-UV LED light is not an obstacle to correctly reading the dice result, due to direct reflection, additional polarizers may be mounted on the lens or in front of the cameras to eliminate such reflections. The output of the near-UV camera may be input to a computing device in communication with the craps table, such as illustrated in FIG. 8, in order to analyze the camera input and read the result of the pips on the dice.

Figure 3:
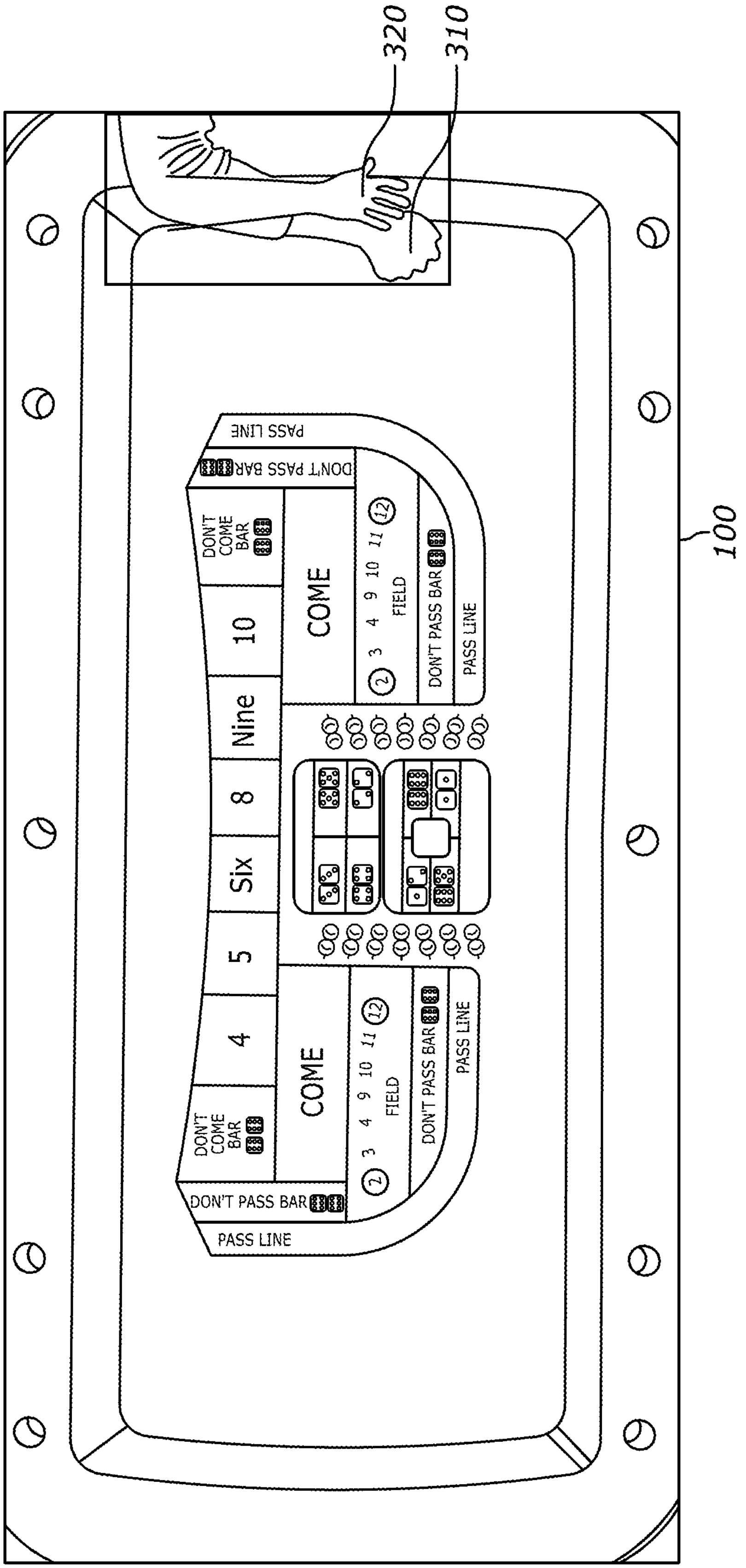
FIG. 3 is a top view of a craps table illustrating optic recognition and tracking of a shooter's hand holding dice before a roll.
Figure 4:
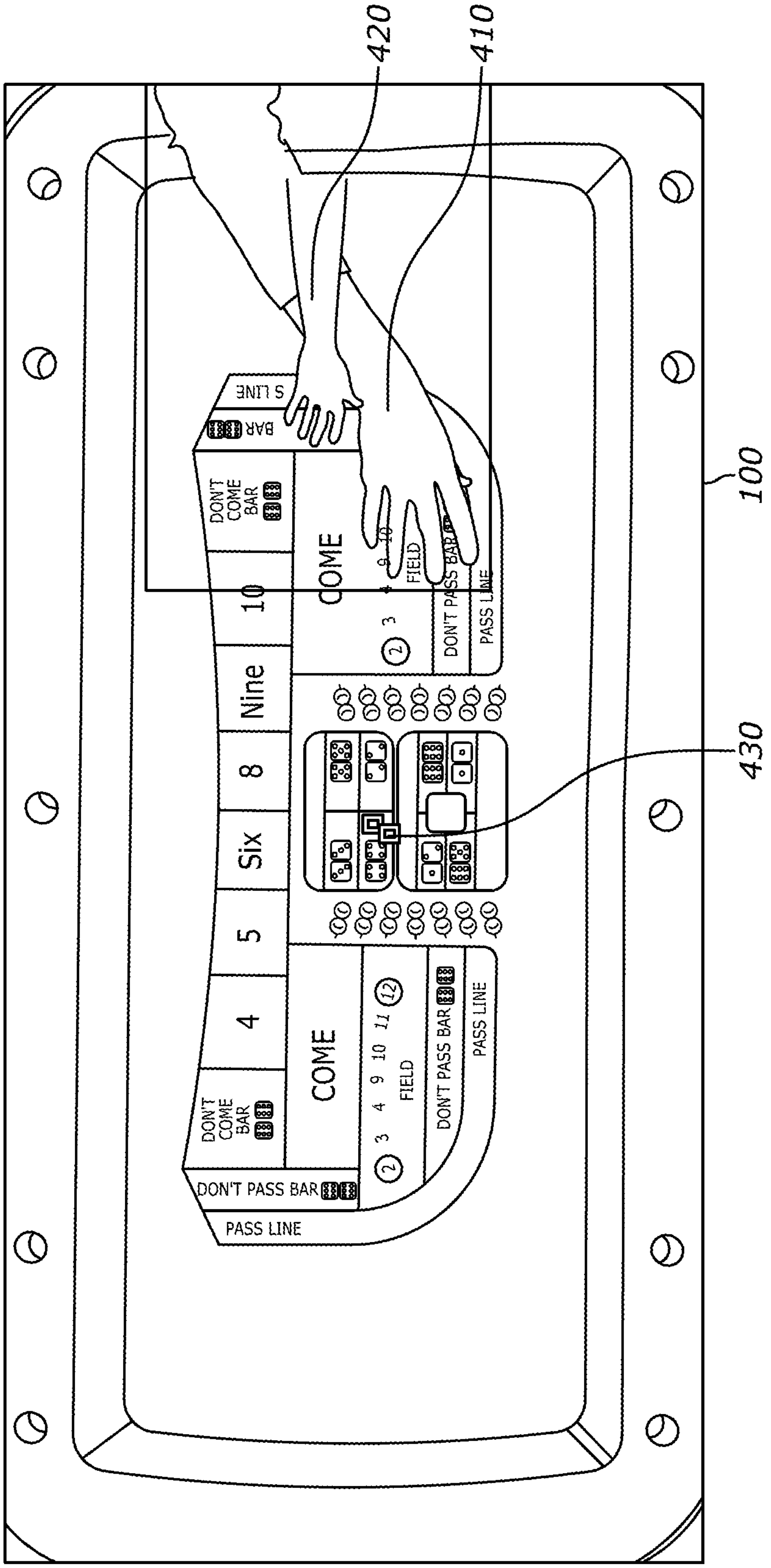
FIG. 4 is a top view of a craps table illustrating optic recognition and tracking of the shooter's hand and flying dice during a roll.

In addition to the near-UV cameras, a plurality of additional cameras operating under ambient lighting conditions may be used, in conjunction with the computing device, to analyze the cameras' output data and track objects on the table and any events happening during a game, such as a shooter taking the dice in their hand, the shooter following the dice, the dealer placing the puck to indicate the point, the dealer using the stick to place bets or clear the table, the dealer moving the dice either to the shooter or after the roll, someone placing their hand on or too near the table, non-identified objects on the table, etc. FIG. 3 is an illustration of the cameras' recognizing the shooter's hand 310 positioned over table 100 when the shooter has the dice in their hand and displaying the shooter's hand and the table. The hand image 320 is the computing device-generated version of the shooter's hand 310 displayed on an overlay of the display of the shooter's hand and the table. The hand image 320 may indicate that the shooter has the dice or is perhaps in a position to throw the dice. In the event that the dice can only be observed or detected while in the dice area 106 or when they have left the dice area 106, the hand image 320 may indicate that the dice should be ready to be thrown even if that may not be the case. FIG. 4 is an illustration of the cameras' recognition of the shooter's hand 410 as the dice are thrown for a roll and hand image 420 is the computer-generated overlay version of the shooter's hand 410 indicating that a roll has been initiated. The dice 430 are a computer-generated version of the actual physical dice that have been rolled as tracked by the ambient light cameras as well as the near-UV cameras/sensors.

Figure 5:
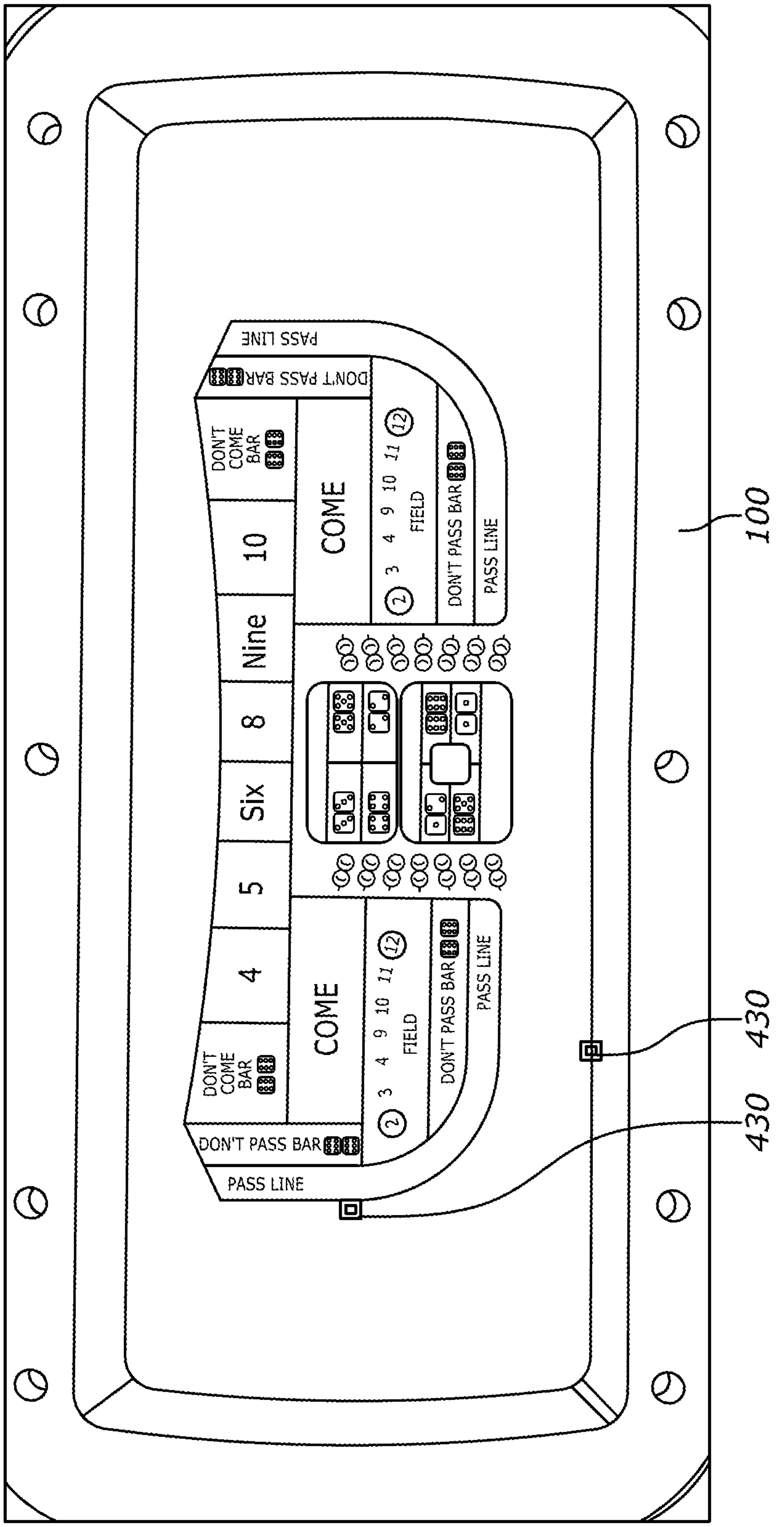
FIG. 5 is a top view of a craps table illustrating optic recognition and tracking of dice as the result of a roll.

FIG. 5 is an illustration of the result of a roll where computer-generated overlay versions of the dice 430 are shown. The pips on the dice would be recognized by the near-UV cameras. As an additional level of reliability, the pips indicating the result of the dice would also be read by the ambient light cameras and then compared to the result of the near-UV cameras. If the results match, this match may be indicated to the dealer so the dealer does not need to confirm the reading of the near-UV cameras. If there is not a match, the dealer may need to determine in the near-UV cameras' result could be confirmed or be given a period of time to cancel the result. If there is no match, no confirmation, or if the result is canceled, a trigger warning a casino supervisor could be generated.

Figure 6:
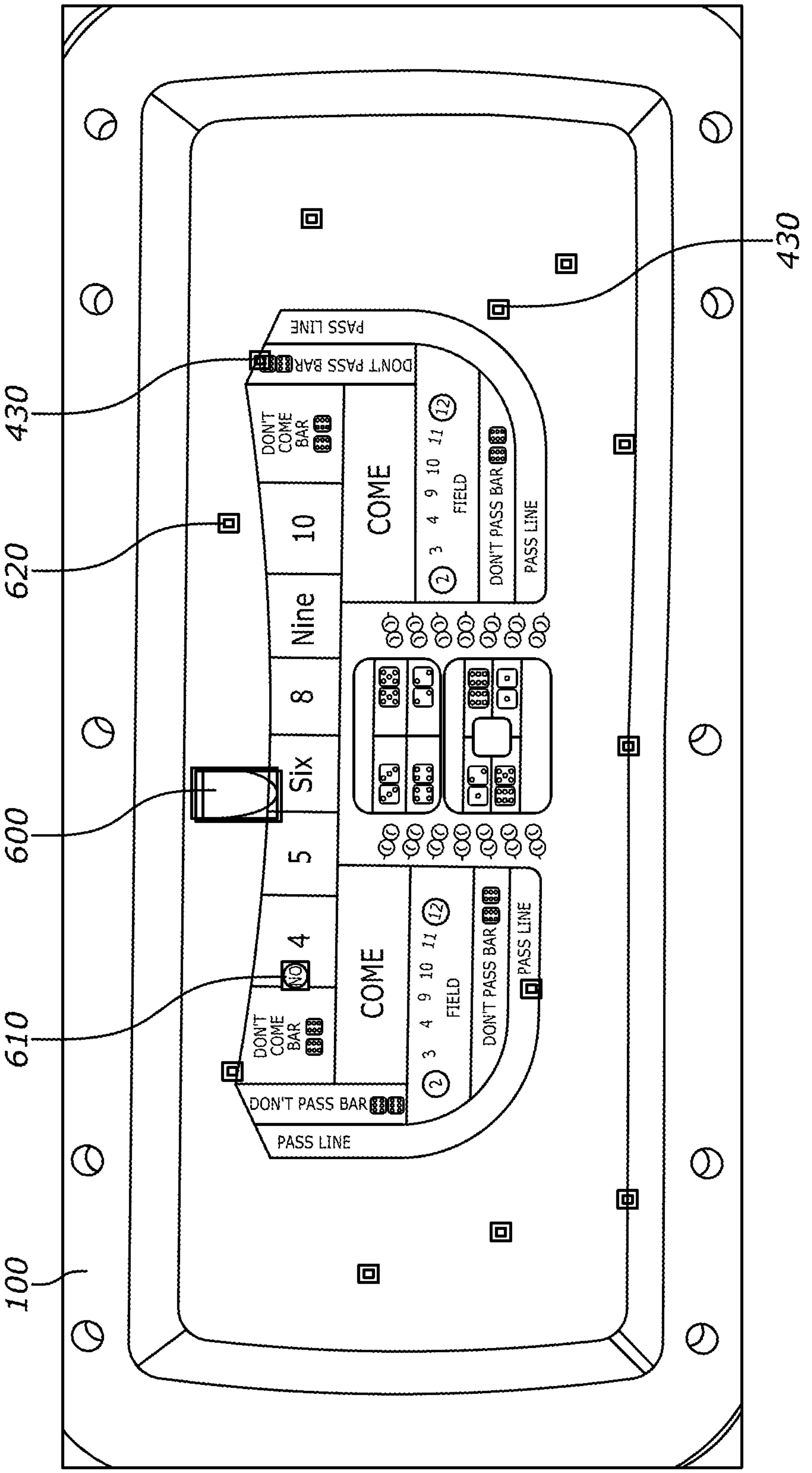
FIG. 6 is a top view of a craps table illustrating optic recognition and tracking of dice and various other objects over time.
Figure 7:
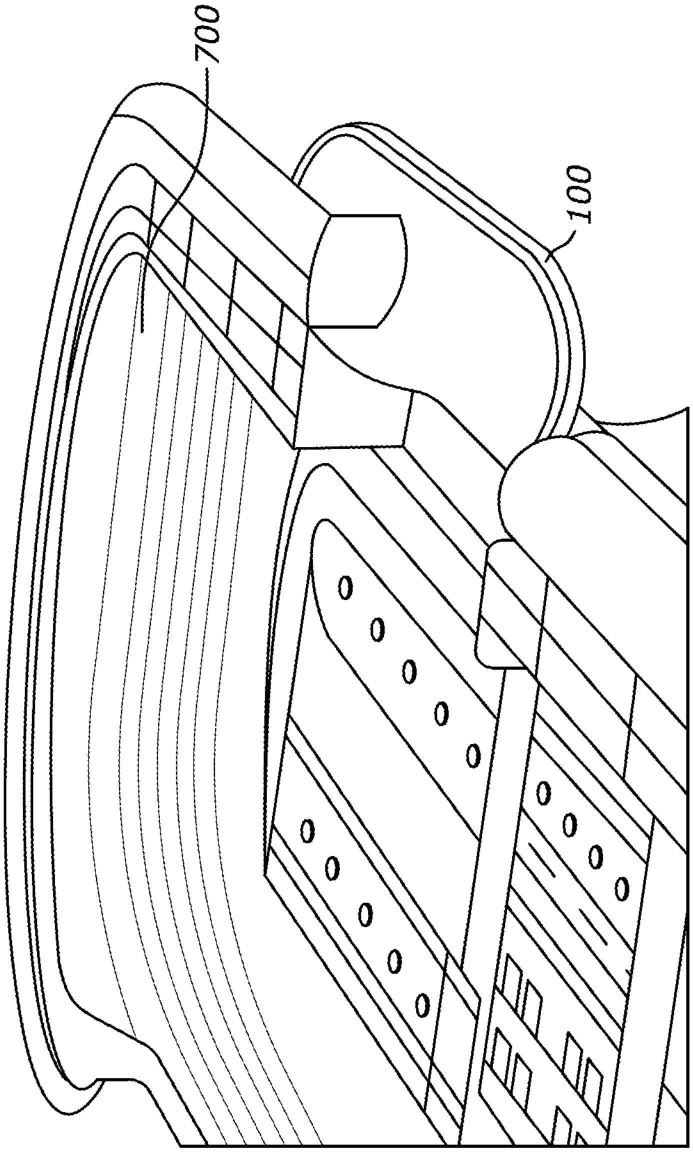
FIG. 7 is a partial, perspective view of a craps table illustrating an warning band.

All of the above-noted events can be recognized during the regular progress of a game or between games and depending on the circumstances can result in the triggering of a warning event to the dealer and/or a casino supervisor. As illustrated in FIG. 6, all of the recognized dice 430 during a shooter's turn of numerous games can be shown on the overlay, along with the dice boat 600 that contained the five dice from which the shooting dice were selected, and the puck 610 indicating the point. If any other objects are placed on or near the table, such as the additional dice 620 or some other object, a trigger warning can be initiated. As illustrated in FIG. 7, as an extra level of awareness and security, an LED strip 700 can be added to the interior wall of the table 100. Depending on the event, the LED strip 700 could be colored in a manner that signals a specific event. For example, if there is a player's hand on the table during a roll, the LED strip could be colored red so as to signal the dealer and the supervisor that a not-allowed event is happening on the table.

In another embodiment, the craps table may be operated in a physical location remote from one or more players placing bets associated with the craps table. From an Internet connected computer in communication with computerized components of the craps table, such as the display and dealer's console, the player may access a betting layout configured to enable the player to place one or more bets by placing a betting amount (i.e., credits) at different locations of a graphical user interface associated with the craps table. The player's graphical user interface may even enable the remote player to be the shooter by allowing the player to select two dice from the boat to be rolled, indicating when the two dice are to be picked up, and indicating when the dice are to be rolled. The actual picking up of the dice and rolling of the dice could be performed by a person physically located where the craps table is located based on cues provided to that person from the computer system. The player's graphical user interface could also provide tracking data of the shooter's hand, the roll, the flying dice and the result as well as other items and events that can be detected, thereby giving the player further assurance that game is fair. Alternatively, the shooter's hand could be tracked performing a throwing motion even when no physical dice are being used. Virtual or simulated dice may then be thrown on the table using computer generated images.

In an embodiment, a craps gaming system, comprising: a craps table having a layout and configured to enable a player to physically be the shooter of dice at the craps table; one or more ambient light cameras positioned to observe action above the layout and output optical data including the observed action and at least the layout on a display; and a computing device receiving and analyzing the optical data, determining a result of the dice, and generating an overlay for the display including computing device-generated images of the dice and the observed action.

In the embodiment, wherein the computing device-generated images include an image of the shooter's hand when holding the dice to be rolled.

In the embodiment, wherein the computing device-generated images include an image of shooter's hand when rolling the dice.

In the embodiment, wherein the computing device-generated images include images of the dice while rolling.

In the embodiment, wherein the computing device-generated images include an image of the result.

In the embodiment, wherein the computing device-generated images include images of results of all dice rolls during the shooter's turn to be shooter.

In the embodiment, wherein the computing device-generated images include an image of a dice boat.

In the embodiment, wherein the computing device-generated images include an image of a puck.

In the embodiment, wherein the computing device-generated images include an image of a player's hand other than the shooter's hand.

In the embodiment, wherein the computing device-generated images include an image of an unrecognized object.

In the embodiment, further comprising an LED strip placed around an interior wall of the craps table and above the layout and configured to signal a warning based on one of the computing device-generated images.

In the embodiment, further comprising a display system positioned over the craps table, the display system including the one or more ambient light cameras.

In the embodiment, further comprising one or more near-UV cameras outputting near-UV optical data, the one or more near-UV cameras being positioned within the display system.

In the embodiment, further comprising a filter placed in front of the lens of the one or more cameras, the filter blocking ambient light outside of approximately 390-425 nm wavelength.

In the embodiment, further comprising a polarizer placed in front of the lens of the one or more near-UV cameras.

In the embodiment, wherein the computing device further receiving and analyzing the near-UV optical data and determining a second result of the dice, wherein the second result is compared to the result.

In the embodiment, wherein when the second result does not match the result a warning is triggered.

In the embodiment, further comprising an LED strip placed around an interior wall of the craps table and above the layout and configured to light up to provided the warning.

In the embodiment, wherein when the second result matches the result no confirmation of the result is required by a dealer.

In the embodiment, wherein the craps table is operated in a location separate from at least one player accessing the craps table remotely with a computer.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The techniques described above can be implemented on a computing device associated with a gaming device (e.g., a machine operating a live craps game), a plurality of computing devices associated with a plurality of gaming devices, a controller in communication with the gaming device(s) (e.g., a controller configured to synchronize the gaming devices(s)), or a plurality of controllers in communication with the gaming device(s). Additionally, the techniques may be distributed between the computing device(s) and the controller(s). FIG. 8 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the shooter selection and console mirroring, as described above. The computing system components may be present in the gaming device, in a server or other component of a network, or distributed between some combinations of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, and velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

As previously noted, the various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed:

1. A craps gaming system, comprising:

a craps table having a layout and configured to enable a player to physically be the shooter of dice at the craps table;

one or more ambient light cameras positioned to observe action above the layout and output optical data including the observed action and at least the layout on a display; and a computing device receiving and analyzing the optical data, determining a result of the dice, and generating an overlay for the display including-computing device-generated images of the dice and the observed action superimposed on the optical data captured by the one or more ambient light cameras, wherein the computing device-generated images track and correspond to physical dice rolled by the shooter.

2. The craps gaming system as recited in claim 1, wherein the computing device-generated images include an image of the shooter’s hand when holding the dice to be rolled.

3. The craps gaming system as recited in claim 1, wherein the computing device-generated images include an image of shooter’s hand when rolling the dice.

4. The craps gaming system as recited in claim 1, wherein the computing device-generated images include images of the dice while rolling.

5. The craps gaming system as recited in claim 1, wherein the computing device-generated images include an image of the result.

6. The craps gaming system as recited in claim 1, wherein the computing device-generated images include images of results of all dice rolls during the shooter’s turn to be shooter.

7. The craps gaming system as recited in claim 1, wherein the computing device-generated images include an image of a dice boat.

8. The craps gaming system as recited in claim 1, wherein the computing device-generated images include an image of a puck.

9. The craps gaming system as recited in claim 1, wherein the computing device-generated images include an image of a player’s hand other than the shooter’s hand.

10. The craps gaming system as recited in claim 1, wherein the computing device-generated images include an image of an unrecognized object.

11. The craps gaming system as recited in claim 1, further comprising an LED strip placed around an interior wall of the craps table and above the layout and configured to signal a warning based on one of the computing device-generated images.

12. The craps gaming system as recited in claim 1, further comprising a display system positioned over the craps table, the display system including the one or more ambient light cameras.

13. The craps gaming system as recited in claim 1, further comprising one or more near-UV cameras outputting near-UV optical data, the one or more near-UV cameras being positioned within the display system.

14. The craps gaming system as recited in claim 13, further comprising a filter placed in front of the lens of the one or more cameras, the filter blocking ambient light outside of approximately 390-425 nm wavelength.

15. The craps gaming system as recited in claim 14, further comprising a polarizer placed in front of the lens of the one or more near-UV cameras.

16. The craps gaming system as recited in claim 15, wherein the computing device further receiving and analyzing the near-UV optical data and determining a second result of the dice, wherein the second result is compared to the result.

17. The craps gaming system as recited in claim 16, wherein when the second result does not match the result a warning is triggered.

18. The craps gaming system as recited in claim 17, further comprising an LED strip placed around an interior wall of the craps table and above the layout and configured to light up to provided the warning.

19. The craps gaming system as recited in claim 16, wherein when the second result matches the result no confirmation of the result is required by a dealer.

20. The craps gaming system as recited in claim 1, wherein the craps table is operated in a location separate from at least one player accessing the craps table remotely with a computer.

* * * * *